United States Patent
Choi et al.

(10) Patent No.: US 9,211,597 B2
(45) Date of Patent: Dec. 15, 2015

(54) CUTTING TOOL AND CUTTING INSERT FOR THE SAME

(75) Inventors: Chang Hee Choi, Daegu (KR); Chang Gyu Park, Daegu (KR)

(73) Assignee: TaeguTec, Ltd., Daegi (KR)

( * ) Notice: Subject to any disclaimer, the term of this patent is extended or adjusted under 35 U.S.C. 154(b) by 889 days.

(21) Appl. No.: 13/318,754

(22) PCT Filed: Jun. 10, 2009

(86) PCT No.: PCT/KR2009/003106
§ 371 (c)(1),
(2), (4) Date: Nov. 3, 2011

(87) PCT Pub. No.: WO2010/128706
PCT Pub. Date: Nov. 11, 2010

(65) Prior Publication Data
US 2012/0051852 A1     Mar. 1, 2012

(30) Foreign Application Priority Data

May 7, 2009 (KR) .................. 10-2009-0039681

(51) Int. Cl.
*B23C 5/16* (2006.01)
*B23C 5/24* (2006.01)
*B23C 5/20* (2006.01)

(52) U.S. Cl.
CPC ......... *B23C 5/2441* (2013.01); *B23B 2200/085* (2013.01); *B23B 2200/088* (2013.01);
(Continued)

(58) Field of Classification Search
CPC ............ B23C 220/86; B23C 2210/161; B23C 2210/168

USPC ........ 407/40, 44, 46, 51, 67, 92, 96, 102, 103
See application file for complete search history.

(56) References Cited

U.S. PATENT DOCUMENTS 2,239,794 A * 4/1941 Morse ............................ 407/96
5,033,916 A    7/1991 Dunklau
(Continued)

FOREIGN PATENT DOCUMENTS

EP      1 666 179 A2    6/2006
FR      2 894 858 A1    6/2007
(Continued)

OTHER PUBLICATIONS

Extended European Search Report dated Sep. 25, 2012 issued in European counterpart application (No. 09844373.2).
(Continued)

*Primary Examiner* — William Fridie, Jr.
(74) *Attorney, Agent, or Firm* — Womble Carlyle Sandridge & Rice PLLC

(57) ABSTRACT

A cutting tool includes one or more cutting portions. Each of the cutting portions has a cutting insert and an insert pocket for mounting the cutting insert. The insert pocket has a top surface with one or more projecting portions with a shape of serration, and a bottom supporting surface. The cutting insert has a top surface mating with said projecting portions of the insert pocket, and a bottom surface mating with the bottom supporting surface of the insert pocket. The top surface of the cutting insert has one or more outwardly sloped surfaces mating with the projecting portions of the insert pocket, and one or more inwardly sloped surfaces positioned off the projecting portions.

19 Claims, 8 Drawing Sheets

(52) U.S. Cl.
CPC ......... *B23B2205/02* (2013.01); *B23B 2205/12* (2013.01); *B23C 2200/085* (2013.01); *B23C 2200/086* (2013.01); *B23C 2210/161* (2013.01); *B23C 2210/168* (2013.01); *Y10T 407/1928* (2015.01); *Y10T 407/1942* (2015.01); *Y10T 407/2272* (2015.01)

(56) References Cited

U.S. PATENT DOCUMENTS

| | | | |
|---|---|---|---|
| 6,261,032 B1 * | 7/2001 | Duwe et al. ................ | 407/110 |
| 6,607,335 B2 * | 8/2003 | Morgulis .................... | 407/40 |
| 7,390,150 B2 * | 6/2008 | Kocherovsky et al. ...... | 407/40 |
| 7,607,868 B2 * | 10/2009 | Noggle ....................... | 407/113 |
| 2004/0197155 A1 | 10/2004 | Robinson et al. | |
| 2009/0238650 A1 | 9/2009 | Jansson | |

FOREIGN PATENT DOCUMENTS

| | | |
|---|---|---|
| JP | 62-188318 U | 11/1987 |
| JP | 05-092314 | 4/1993 |
| JP | 6-190608 | 7/1994 |
| JP | 07-251313 | 10/1995 |
| JP | 11-010434 | 1/1999 |
| JP | 11-156607 | 6/1999 |
| WO | WO 2004/062839 A1 | 7/2004 |

OTHER PUBLICATIONS

International Search Report in PCT/KR2009/003106, dated Jun. 7, 2010.
Written Opinion in PCT/KR2009/003106, dated Jun. 7, 2010.
Official Action dated Mar. 22, 2013 issued in Japanese counterpart application (No. 2012-508376).

* cited by examiner

CUTTING TOOL AND CUTTING INSERT FOR THE SAME

RELATED APPLICATIONS

This is a 35 USC 371 U.S. National Phase of International Application No. PCT/KR2008/003106, filed 10 Jun. 2009 and published in English as WO 2010/128706A1 on 11 Nov. 2010, which claims priority to KR 10-2009-0039681, filed 07 May. 2009. The contents of the aforementioned applications are incorporated by reference in their entirety.

TECHNICAL FIELD

The present invention relates to a cutting tool for machining metallic materials and a cutting insert configured to be used with said cutting tool.

BACKGROUND ART

Conventional cutting tools employ various means for securing cutting inserts to a cutter body. In some cutting tools, threaded bores are provided in the cutter body while corresponding through-bores are provided in the cutting inserts. The cutting inserts are directly secured to the cutter body by using screws. Such a method, however, requires various metal cutting operations to form the thread bores in the cutter body. Also, the threaded bores can weaken the cutter body. Furthermore, when the cutting tool is damaged, a part of the screw that breaks off can fall into the threaded bore of the cutter body.

Other known cutting tools may adopt a structure of securing the cartridge by means of a wedge. For example, U.S. Pat. No. 7,390,150 discloses a cutting tool that includes cutting inserts with wedges and serrations. FIGS. 1 and 2 illustrate a cutting tool according to such prior art. A tool holder body 1 is plate-shaped and comprises a plurality of insert pockets 3, which are arranged at same intervals around the outer circumference. Each of the insert pockets 3 receives a cutting insert 2 and a wedge 4. The top surface of the cutting insert 2 includes serrations 2'. The top surface of the insert pocket 3 includes serrations 3' corresponding to the serrations 2' of the cutting insert 2. When the cutting insert 2 is mounted on the insert pocket 3, the serrations 2' of the cutting insert 2 and the serrations 3' of the insert pocket 3 engage with each other. The wedge 4 is located under the cutting insert 2 in the insert pocket 3. The screw 5 is fastened into a threaded hole of the insert pocket 3 through a threaded hole of the wedge 4. As the screw 5 advances into the threaded hole of the insert pocket 3, the wedge 4 is pushed toward the threaded hole of the insert pocket 3. Since the wedge 4 tapers inwardly, as the wedge 4 advances toward the threaded hole of the insert pocket 3, the cutting insert 2 is clamped in the insert pocket 3 by the wedge 4.

SUMMARY

In the prior art as discussed above, the radial position of the cutting insert is determined by the engagement between the serrations 2' on the top surface of the cutting insert and the serrations 3' of the insert pocket. Further, there is a gap between the radial inner side surface of the cutting insert and the inner side surface of the tool holder body, which receives the cutting insert. Without such a gap, there may be interference between the two parts, i.e., the cutting insert and the tool holder body. Accordingly, the cutting insert is supported only by the top and bottom surfaces, and there is no support in the radial direction. That is, such a structure of the prior art may not provide a sufficient clamping force for the cutting insert.

Further, as the serrations 2' and 3' become the reference position for mounting, it becomes difficult to produce the cutting insert. Also, the radial positions of the cutting insert become inconsistent after adjustment due to manufacturing and assembly errors. As a result, the accuracy of the cutting processes is significantly reduced.

The objective of the present invention is to provide a cutting insert, which overcomes or remarkably reduces the above disadvantages, and a cutting tool designed to use such a cutting insert.

To achieve the above objective, the present invention provides a cutting tool with one or more cutting portions. Each of the one or more cutting portions comprises a cutting insert and an insert pocket formed on a body of the cutting tool for mounting the cutting insert. Said insert pocket comprises a top surface with one or more projecting portions with a shape of serration, a rear supporting surface and a bottom supporting surface. Said cutting insert comprises a top surface configured to mate with said one or more projecting portions with a shape of serration of the insert pocket, a first side surface configured to mate with the rear supporting surface of the insert pocket, and a bottom surface configured to mate with the bottom supporting surface of the insert pocket. The top surface of the cutting insert comprises one or more outwardly sloped surfaces configured to mate with the one or more projecting portions on the top surface of the insert pocket and one or more inwardly sloped surfaces positioned off the one or more projecting portions of the insert pocket.

According to one embodiment of the present invention, the top surface of the insert pocket further comprises a flat surface extended from the one or more projecting portions. The top surface of the cutting insert further comprises a flat surface contacting the flat surface of the insert pocket when the cutting insert is mounted on the insert pocket.

According to one embodiment of the present invention, the projecting portions of the top surface of the insert pocket comprise a first projecting portion positioned in the insert pocket. An inwardly sloped surface of the first projecting portion forms an angle in the range of 30° to 45° with respect to the bottom supporting surface of the insert pocket.

According to another embodiment of the present invention, contrary to the above-mentioned embodiment, the top surface of the insert pocket comprises one or more recessed portions with a shape of serration. Further, the top surface of the cutting insert comprises one or more outwardly sloped surfaces configured to mate with the one or more recessed portions on the top surface of the insert pocket, and one or more inwardly sloped surfaces positioned off the one or more recessed portions of the insert pocket.

According to the other embodiment of the present invention, an upper portion of the top surface of the insert pocket comprises a threaded hole integrally formed in the cutting tool, a slot formed along the threaded hole, and a screw inserted into the threaded hole to push the top surface of the insert pocket toward the top surface of the cutting insert.

According to the other embodiment of the present invention, the one or more cutting portions further comprise a cartridge, the lower portion of which includes the top surface of the insert pocket with one or more projecting portions with a shape of serration, and a cartridge pocket formed on a body of the cutting tool for receiving the cartridge. Said cartridge comprises a threaded hole formed at the radial outer side surface of the cutting tool toward the inner surface, a slot formed along the threaded hole, and a screw inserted into the threaded hole to push the top surface of the insert pocket toward the top surface of the cutting insert.

According to the present invention, since the cutting insert is supported by three surfaces (i.e., top surface, bottom surface and first side surface), it can be more securely mounted than the prior art supported by two surfaces (i.e., top surface and bottom surface) of the cutting insert. In the present invention, sufficient clamping forces can be provided.

Further, the present invention needs fewer parts to clamp the cutting insert compared to the prior art using the wedge method.

Also, according to the present invention, since the first side surface of the cutting insert completely and tightly contacts the insert pocket and functions as the reference surface, the position of the cutting edge is easily controllable to be always fixed. Thus, the present invention has a higher precision of cutting operation compared to the prior art.

Moreover, according to the other embodiment of the present invention, the cutting insert includes a cartridge, which is at least partially formed on the top surface of the insert pocket, and a cartridge pocket for receiving the cartridge. When the saw-toothed projecting or recessed portions of the top surface 32 of the insert pocket are worn out or broken due to frequent contacts with the top surface 22 of the cutting insert, the worker only has to replace the damaged cartridge instead of the entire cutter body. As such, since the present invention can extend the service life of the cutting tool, it is more economical compared to the method, which forms the top surface of the insert pocket directly on the cutter body without using the cartridge.

DETAILED DESCRIPTION

In view of the accompanying drawings, the present invention will be described in detail below.

Figure 3:
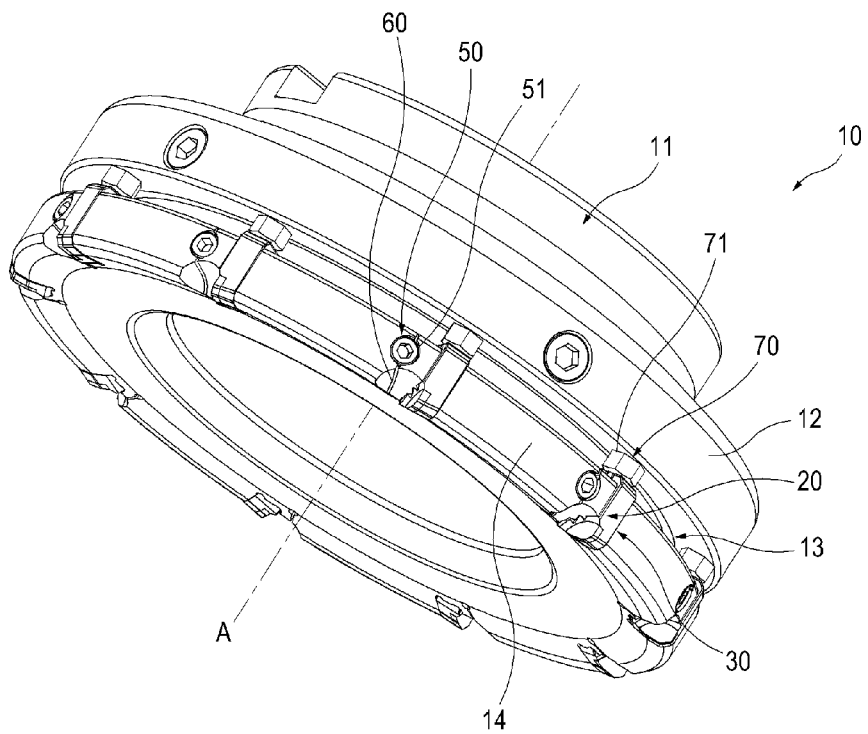
FIG. 3 is a perspective view of a cutting tool according to the present invention.

FIG. 3 is a perspective view of a cutting tool according to the present invention. A cutter body 10 comprises a cylindrical mounting portion 11 mounted at a spindle of a milling machine, a first flange portion 12, a second flange portion 14, and a cylindrical connecting portion 13 connecting between the first flange portion 12 and the second flange portion 14. The first flange portion 12 extends from the cylindrical mounting portion 11 and has an outer diameter greater than that of the mounting portion 11. The second flange portion 14 is positioned off the cutter body's end from the first flange portion 12. The cylindrical connecting portion 13 has an outer diameter smaller than those of the first and second flange portions 12 and 14. The second flange portion 14 includes a plurality of insert pockets 30 for receiving cutting inserts 20, which are formed at the periphery of the second flange portion. The cutting insert 20 is secured in the cutter body by a cutting insert securing screw 50. A slot 60 is formed between the cutting insert securing screw 50 and the insert pocket 30. The slot 60 is configured to facilitate the assembly of the cutting insert 20.

Referring now to FIGS. 3 and 8-10, a screw hole 71 is formed on the bottom surface of the first flange portion 12 adjacent to the insert pocket 30. The adjusting screw 70 is inserted into the screw hole 71. A side surface of the cutting insert 20, which is mounted on the insert pocket 30, contacts the head 72 of the adjusting screw 70. As the head 72 of the adjusting screw 70 rotates, the cutting insert 20 can move in the axial direction A of the cutting tool. The adjusting screw 70 can easily and precisely adjust the axial position of the cutting insert. Hereinafter, the "axial direction" of the cutting tool means the axial direction illustrated as 'A' in FIG. 3. Further, the "radial direction" refers to the direction headed from the center of the cutter body toward its periphery.

Figure 4:
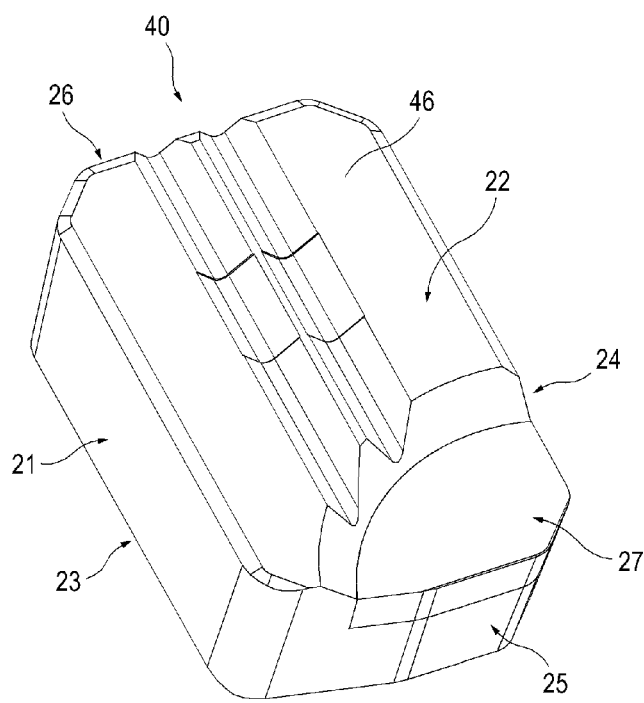
FIG. 4 is a perspective view of the cutting insert according to the present invention.
Figure 5:
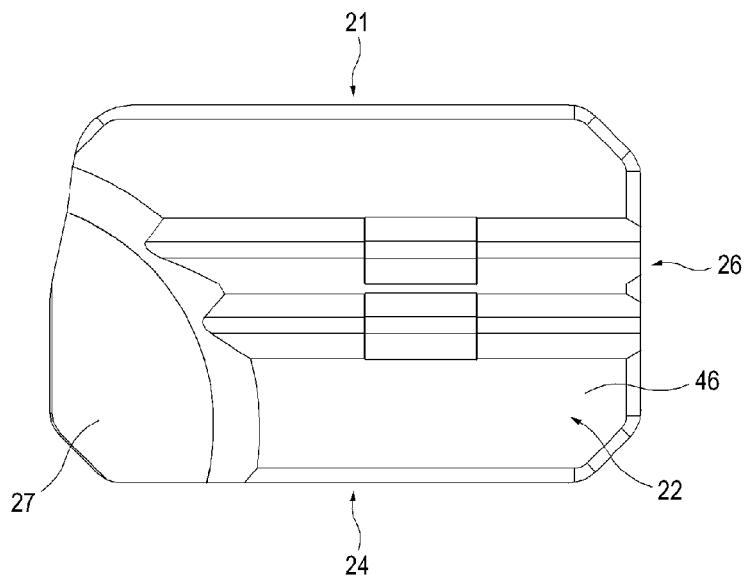
FIG. 5 is a top view of the cutting insert according to the present invention.
Figure 6:
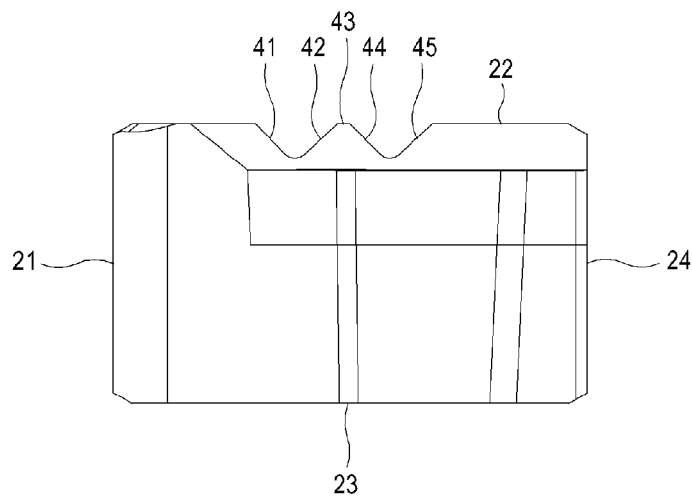
FIG. 6 is a front view of the cutting insert according to the present invention.
Figure 7:
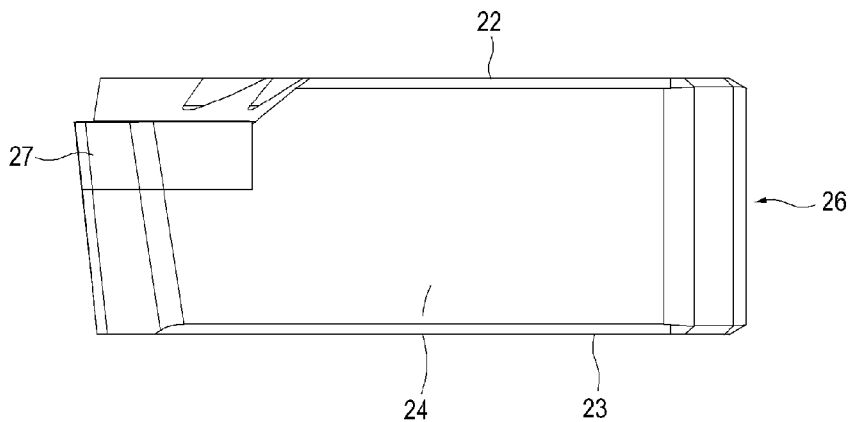
FIG. 7 is a side view of the cutting insert according to the present invention.

FIG. 4 is a perspective view of the cutting insert 20 according to the present invention. FIGS. 5-7 are a top view, a front view and a side view of the cutting insert 20, respectively. The cutting insert 20 includes a radial inner side surface 21 (or first side surface) contacting the insert pocket's surface located near the center of the cutter body, a top surface 22, a bottom surface 23, a radial outer side surface 24 located at the periphery of the cutter body, an end surface 25 located near the end portion of the cutter body, and a contact surface 26 contacting the head 72 of the adjusting screw 70. The top surface 22 of the cutting insert includes at least one recessed portion 40 with a shape of serration. The cutting insert according to the present embodiment includes two recessed portions 40 with a shape of serration. However, the number of recessed portions with a shape of serration is certainly not limited thereto.

Figure 14:
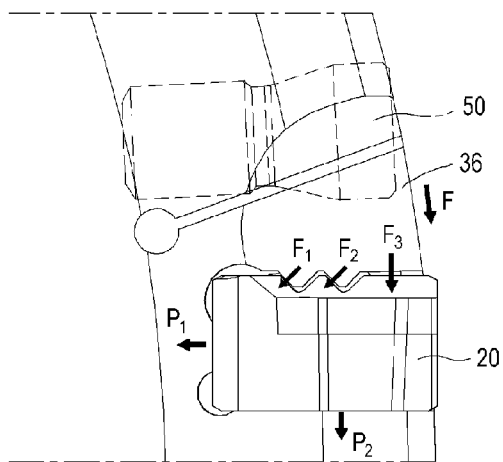
FIG. 14 illustrates the supporting forces of the cutting insert according to the present invention.
Figure 15:
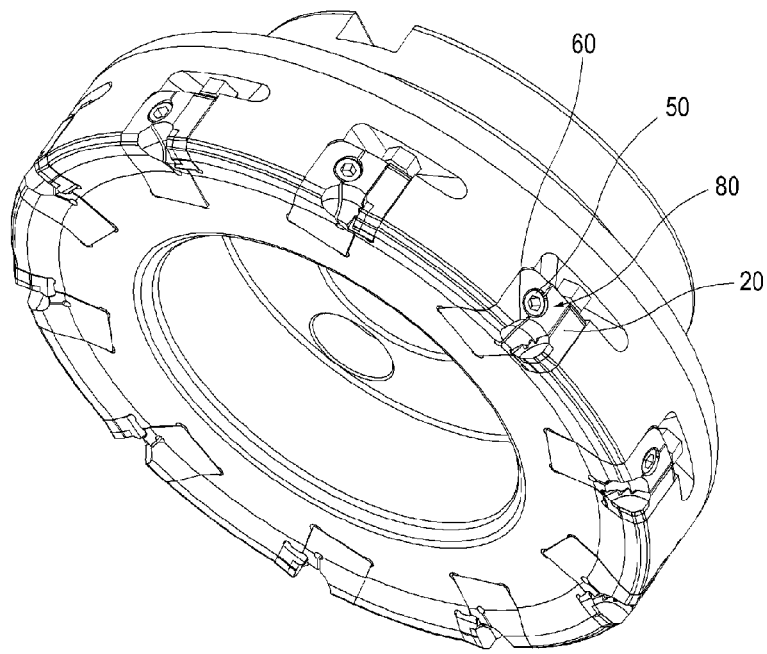
FIG. 15 is a perspective view of the cutting tool according to the other embodiment of the present invention.
Figure 16:
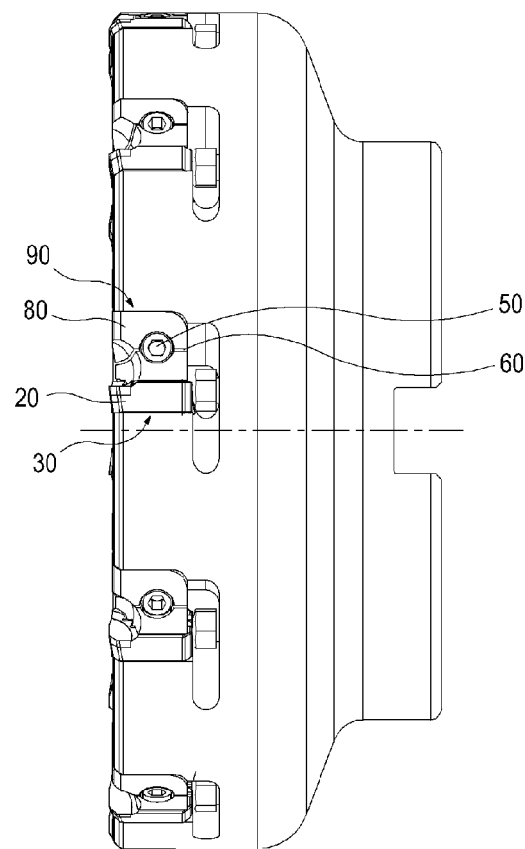
FIG. 16 is a side view of the cutting tool according to the other embodiment of the present invention.
Figure 17:
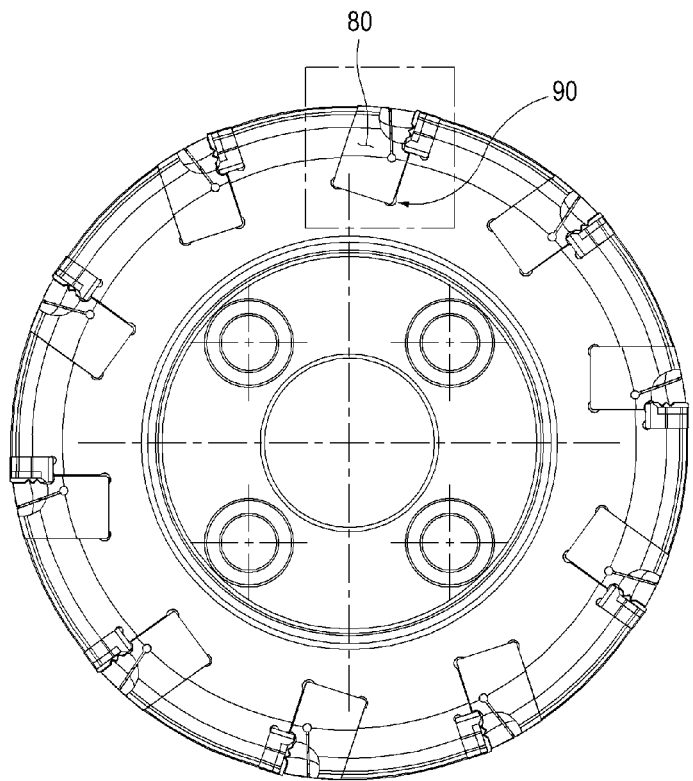
FIG. 17 is a front view of the cutting tool according to the other embodiment of the present invention.
Figure 18:
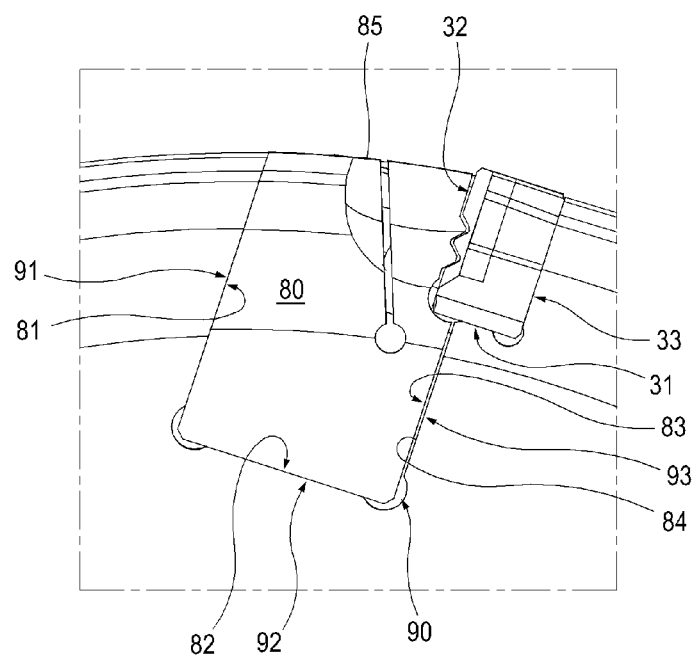
FIG. 18 is a close-up view of the part shown in dotted lines of FIG. 17.

Each recessed portion with a shape of serration includes a radially outwardly sloped surface 41 (or 44), a chamfered top surface 43, and a radially inwardly sloped surface 42 (or 45). As illustrated in FIG. 14, when the cutting insert 20 is mounted on the insert pocket 30 by the cutting insert securing screw 50, only the outwardly sloped surface 41 (or 44), among three surfaces of each recessed portion on the top surface of the cutting insert, contacts the insert pocket 30. That is, there is contact only at one surface among three surfaces of each recessed portion, while there are minute gaps between the other two surfaces and the insert pocket. This ensures a complete surface contact at the radial inner side surface 21 and the bottom surface 23 of the cutting insert. Among the radial outwardly sloped surface 41 and 44, the first outwardly sloped surface 41 and the second outwardly sloped surface 44 form an angle of 45° with respect to the bottom surface 23 of the cutting insert. The first and second outwardly sloped surfaces 41 and 44 preferably form an angle of 30° to 45° with respect to the bottom surface 23 of the cutting insert. If this angle is smaller than 30°, since the radial inner portion of the cutting insert cannot completely achieve tight contact, the cutting insert is prone to come off when the cutting tool rotates. Further, if this angle is greater than 45°, then the top surface of the cutting insert cannot smoothly contact the top surface of the insert pocket.

As another embodiment of the present invention, the top surface 22 of the cutting insert may include at least one projecting portions with a shape of serration instead of the recessed portions with a shape of serration. Each projecting portion with a shape of serration includes a radially outwardly sloped surface, a chamfered top surface, and a radially inwardly sloped surface as the former embodiment. When the cutting insert is mounted on the insert pocket, only the outwardly sloped surface, among three surfaces of each projecting portion on the top surface of the cutting insert, contacts the insert pocket. That is, there is contact only at one surface among three surfaces of each projecting portion, while there are minute gaps between the other two surfaces and the insert pocket. This ensures a complete surface contact at the radial inner side surface 21 and the bottom surface 23 of the cutting insert.

As the other embodiment of the present invention, the top surface 22 of the cutting insert preferably further includes a flat surface 46 extending from the projecting or recessed portion with a shape of serration to the radial outwardly sloped surface 24. In this case, when the cutting insert is mounted on the insert pocket, the flat surface 46, as well as the projecting or recessed portion of the top surface of the cutting insert, contact the insert pocket. This ensures that the cutting insert is more securely clamped in the insert pocket.

The top surface 22 of the cutting insert may further include a cutting tip 27, as shown in FIG. 4. The cutting tip 27 preferably consists of CBN or PCD. The cutting tip made of CBN or PCD is useful to precisely cut the surface of cast iron and aluminum materials, which are utilized as parts of automobile, etc.

Figure 8:
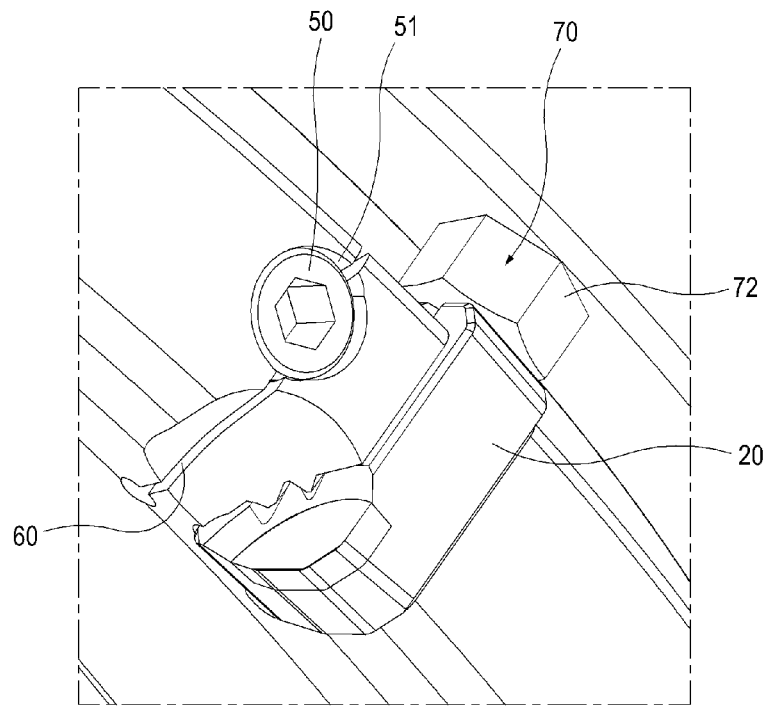
FIG. 8 shows when the cutting insert, the securing screw and the adjusting screw are all mounted on the cutter body according to the present invention.
Figure 9:
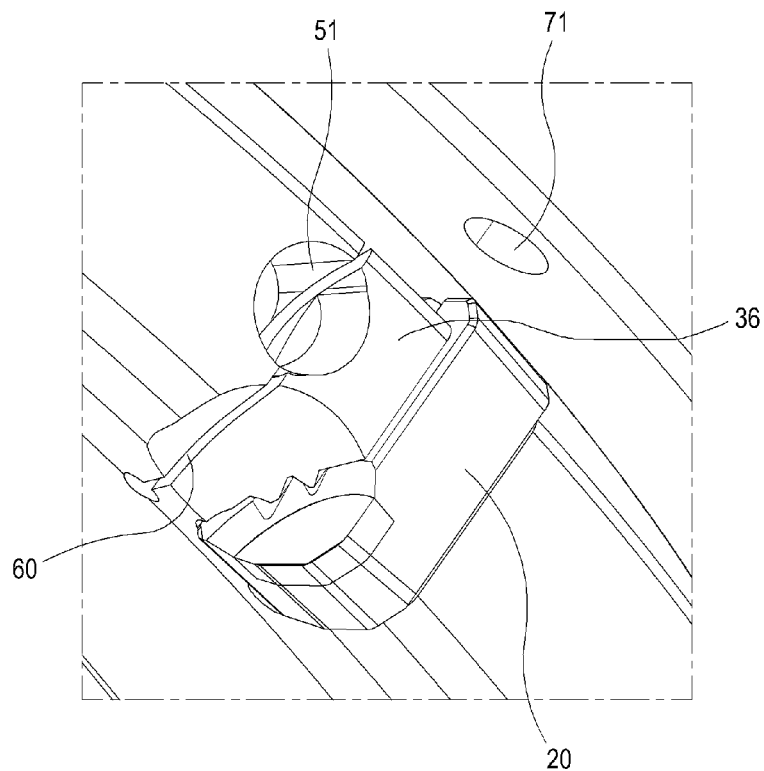
FIG. 9 shows when the securing screw and the adjusting screw are mounted on the cutter body according to the present invention.
Figure 10:
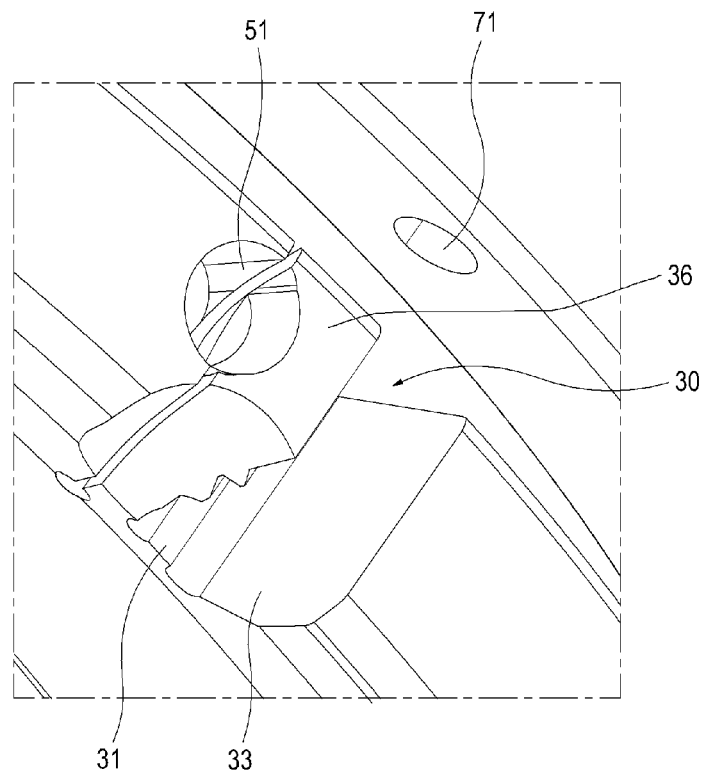
FIGS. 10 and 11 show the state before the cutting insert, the securing screw and the adjusting screw are all mounted on the cutter body according to the present invention.
Figure 11:
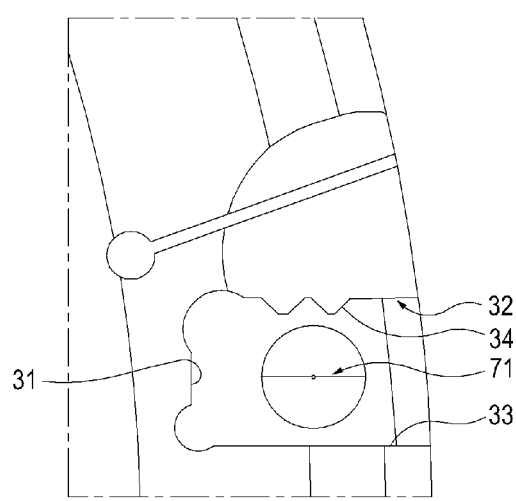
Figure 12:
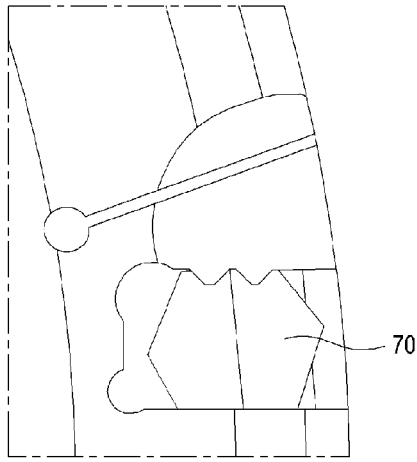
FIG. 12 illustrates the state when only the adjusting screw is mounted on the cutter body according to the present invention.
Figure 13:
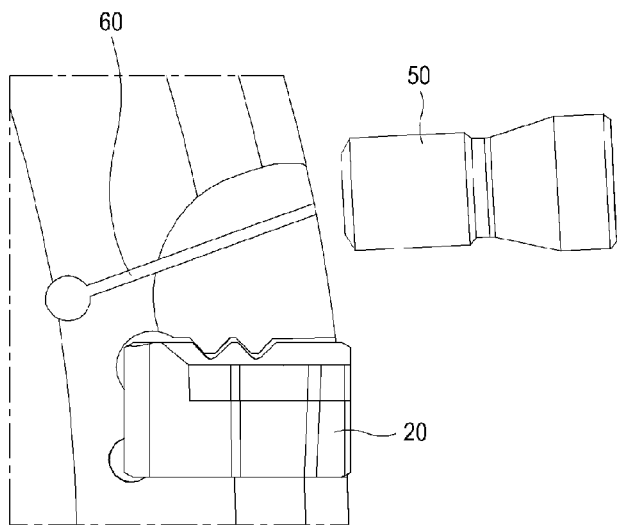
FIG. 13 illustrates the state before the securing screw is mounted on the cutter body according to the present invention.

FIGS. 8-10 are perspective views of the cutter body according to the present invention. FIGS. 11-13 are front views of the cutter body when seen from the end of the cutter body. FIG. 8 illustrates the state of the cutting insert, the securing screw and the adjusting screw all being mounted on the cutter body. FIG. 9 shows the state before the securing screw and the adjusting screw are mounted. FIGS. 10-11 illustrate the state before the cutting insert, the securing screw and the adjusting screw are all mounted. FIG. 12 illustrates the state when only the adjusting screw is mounted. A hole 51, into which the cutting insert securing screw 50 is inserted, and the slot 60 are disposed at the upper portion of the insert pocket 30, on which the cutting insert is seated. A plate-shaped leaf 36 is formed between the slot 60 and the insert pocket 30. The insert pocket includes a radial inner rear supporting surface 31 and a bottom supporting surface 33. In the insert pocket 30 according to the present invention, the radial inner rear supporting surface 31 is perpendicular to the bottom supporting surface 33. The top surface 32 of the insert pocket (i.e., the lower surface of the leaf 36) includes one or more projecting portions 34 with a shape of serration. In order to clamp the cutting insert in the insert pocket, the cutting insert is first inserted into the insert pocket and the cutting insert securing screw 50 is inserted into the hole 51. Then, as the securing screw 50 advances into the hole 51, the head portion of the screw 50 widens the tapered entrance of the hole 51 and the slot 60 becomes wider. Finally, the leaf 36 between the slot 60 and the insert pocket 30 bend downwardly, and the bending force F causes the saw-toothed top surface 32 of the insert pocket to push the cutting insert.

FIG. 14 illustrates the supporting forces of the cutting insert according to the present invention. The bending force F of the leaf 36 due to clamping of the screw 50 causes clamping forces F1 and F2 on the top surface of the cutting insert. The clamping forces F1 and F2 cause a component force P1 perpendicular to the radial inner side surface of the cutting insert and a component force P2 perpendicular to the bottom surface of the cutting insert. The component P1 forces the cutting insert to tightly contact the inner portion of the cutter body, thereby preventing the cutting insert from coming off due to the centrifugal force occurring when the cutting tool rotates. The component P2 allows the tight contact of the bottom surface of the cutting insert. As such, since the cutting insert is supported by three surfaces (i.e., the top surface, the bottom surface and the radial inner side surface), it can be more securely mounted compared to the prior art supported by two surfaces (i.e., the top surface and the bottom surface) of the cutting insert. In the present invention, sufficient clamping forces can be provided.

Figure 1:
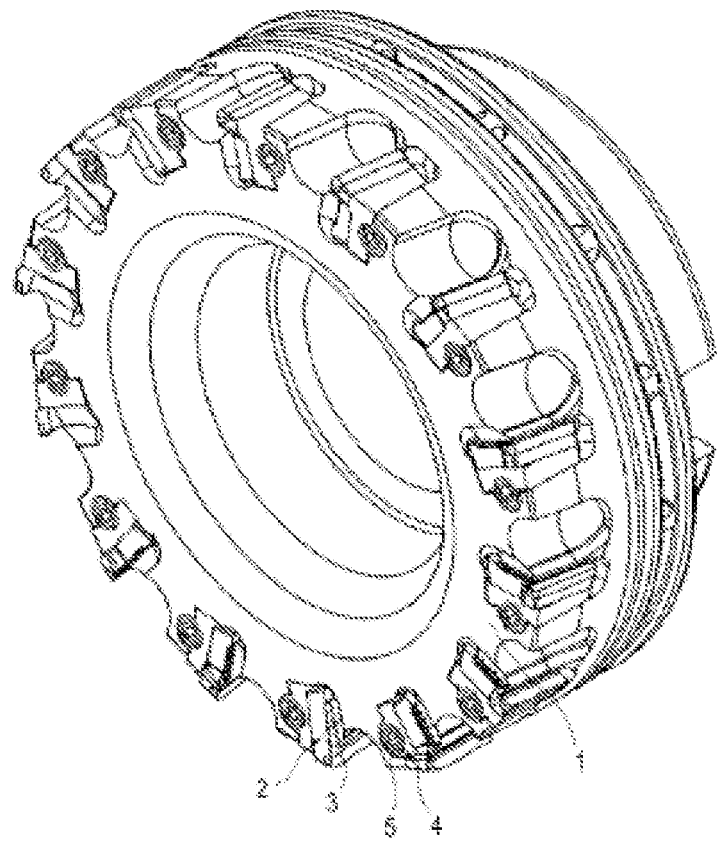
FIGS. 1 and 2 illustrate a cutting tool according to the prior art.
Figure 2:
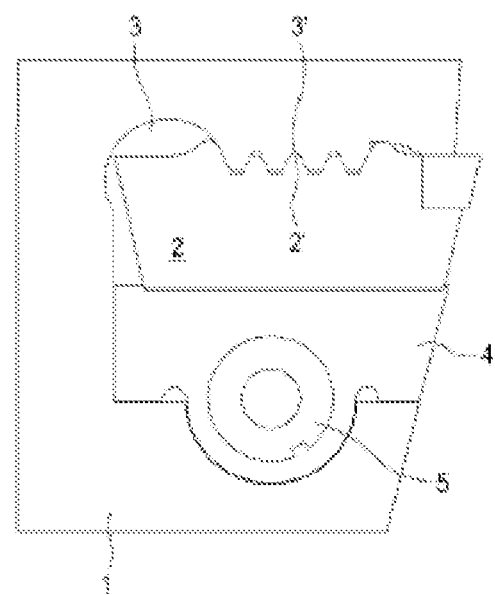

Further, in the prior art illustrated in FIGS. 1 and 2, due to a processing error of the serrations formed on the top surface of the cutting insert and an assembling error, the radial position of the cutting insert changes whenever the cutting insert is mounted. This results in lowering the precision of the cutting operation. However, in the present invention, the radial inner side surface of the cutting insert tightly contacts the insert pocket and functions as the reference surface. Thus, the present invention has a higher precision of cutting operation compared to the prior art.

Although the directions of the forces F1 and F2 of the cutting insert are identical to each other in the present embodiment, the directions of F1 and F2 may be different from each other for proper distribution of the components P1 and P2. That is, the angles that two radially outwardly sloped surfaces 41 and 44 respectively make with the bottom surface of the cutting insert may be different from each other. In the other embodiment, in order to make the force F2 zero, the angle between the outwardly sloped surface 44 and the bottom surface, or the gap between the outwardly sloped surface 44 and the projecting portion of the insert pocket, may be adjusted.

In the other embodiment of the present invention, the top surface of the cutting insert may include at least one projecting portions with a shape of serration instead of the recessed portions with a shape of serration. The top surface of the insert pocket is configured to include the recessed portions with a shape of serration, which correspond to the projecting portions. In this case, since the engagement between the cutting insert and the insert pocket is the same as the former embodiment, detailed explanations will be omitted herein.

In the other embodiment of the present invention, the top surface 22 of the insert pocket further comprises a flat surface 46 extended from the projecting or recessed portions with a shape of serration to the radial outer side surface 24. As illustrated in FIG. 14, the bending force F of the leaf 36 due to clamping of the screw 50 causes the clamping forces F1, F2 and F3 on the top surface of the cutting insert. Since the force F3 serves in the direction perpendicular to the bottom surface of the cutting insert, the tight contact with the bottom supporting surface of the insert pocket can be more reliable.

In the other embodiment of the present invention, as shown in FIGS. 15-18, the cutter body 10 further includes a cartridge 80 as well as a cartridge pocket 90 formed on the cutter body and configured to receive the cartridge 80. The cartridge pocket 90 comprises a top surface 91, a rear supporting surface 92 and a bottom surface 93 connecting to the rear supporting surface 31 of the insert pocket 30. The cartridge 80 includes a top surface 81 contacting the top surface 91 of the cartridge pocket 90, a radial inner side surface 82 contacting the rear supporting surface 92 of the cartridge pocket, a bottom surface 83 that contacts the bottom surface 93 of the cartridge pocket 93 and partially forms the top surface 32 of the insert pocket, and a radial outer side surface 85. The bottom surface 83 of the cartridge consists of the top surface 32 of the insert pocket and a bottom supporting surface 84 contacting the bottom surface 93 of the cartridge pocket. On the radial outer side surface 85 of the cartridge, the screw hole 51 is formed above the top surface 32 of the insert pocket. The slot 60 is formed along the screw hole 51. The screw 50 is inserted into the screw hole 51. Since the function of the top surface 32 of the insert pocket clamping the cutting insert is already explained above, detailed explanations will be omitted herein. According to the present embodiment, when the saw-toothed projecting or recessed portions of the top surface 32 of the insert pocket are worn out or broken due to frequent contacts with the top surface 22 of the cutting insert, the worker only has to replace the damaged cartridge instead of the entire cutter body. As such, since the present invention can extend the lifetime of the cutting tool, it is more economical compared to the method, which forms the top surface of the insert pocket directly on the cutter body without using the cartridge.

It will be apparent to those skilled in the art that various modifications and variations can be made in the present invention without departing from the spirit or scope of the invention. Further, the present invention can be used in various machine work using a cutting insert such as hole processing and turning operations.

The invention claimed is:

1. A rotary cutting tool having rotary axis (A), comprising:
   one or more cutting portions including a cutting insert and an insert pocket formed on a body of the cutting tool for mounting the cutting insert;
   said insert pocket having a top surface with one or more projecting portions with a shape of serration, a bottom supporting surface opposing the top surface and a radial inner rear supporting surface connecting the top surface and the bottom supporting surface;
   said cutting insert having a top surface mating with said one or more projecting portions with a shape of serration of the insert pocket, a bottom surface mating with the bottom supporting surface of the insert pocket, and a radial inner side surface connecting to the cutting insert's top and bottom surfaces,
   wherein the radially inner side surface mates with the insert pocket's radially inner rear supporting surface;
   wherein the top surface of the cutting insert comprises one or more outwardly sloped surfaces mating with the one or more projecting portions on the top surface of the insert pocket and one or more inwardly sloped surfaces positioned off the one or more projecting portions of the insert pocket.

2. The cutting tool according to claim 1, wherein the top surface of the insert pocket further comprises a flat surface extended from the one or more projecting portions, the top surface of the cutting insert further comprising a flat surface contacting the flat surface of the insert pocket when the cutting insert is mounted on the insert pocket.

3. The cutting tool according to claim 1, wherein the projecting portions of the top surface of the insert pocket comprise a first projecting portion positioned in the insert pocket, and wherein an inwardly sloped surface of the first projecting portion forms an angle in the range of 30° to 45° with respect to the bottom supporting surface of the insert pocket.

4. A rotary cutting tool having an rotary axis (A), comprising:
   one or more cutting portions comprising a cutting insert and an insert pocket formed on a body of the cutting tool for mounting the cutting insert;
   said insert pocket having a top surface with one or more recessed portions with a shape of serration, a bottom supporting surface opposing the top surface and a radial inner rear supporting surface connecting the top surface and the bottom supporting surface;
   said cutting insert comprising a top surface mating with said one or more recessed portions with a shape of serration of the insert pocket, a bottom surface mating with the bottom supporting surface of the insert pocket, and a radial inner side surface connecting to the cutting insert's top and bottom surfaces,
   wherein the radial inner side surface mates with the insert pocket's radial inner rear supporting surface;
   wherein the top surface of the cutting insert comprises one or more outwardly sloped surfaces mating with the one or more recessed portions on the top surface of the insert pocket and one or more inwardly sloped surfaces positioned off the one or more recessed portions of the insert pocket.

5. The cutting tool according to claim 4, wherein the top surface of the insert pocket further comprises a flat surface extended from the one or more recessed portions, the top surface of the cutting insert further comprising a flat surface contacting the flat surface of the insert pocket when the cutting insert is mounted on the insert pocket.

6. The cutting tool according to claim 4, wherein the recessed portions of the top surface of the insert pocket comprise a first recessed portion positioned in the insert pocket, and wherein an inwardly sloped surface of the first recessed portion forms an angle in the range of 30° to 45° with respect to the bottom supporting surface of the insert pocket.

7. The cutting tool according to claim 4, wherein an upper portion of the top surface of the insert pocket comprises a threaded hole integrally formed in the cutting tool, a slot formed along the threaded hole, and a screw inserted into the threaded hole to push the top surface of the insert pocket toward the top surface of the cutting insert.

8. The cutting tool according to claim 4, wherein the one or more cutting portions further comprises a cartridge of which lower portion includes the top surface of the insert pocket with one or more projecting portions with a shape of serration and a cartridge pocket formed on a body of the cutting tool for receiving the cartridge; said cartridge comprising a threaded hole formed at the radial outer side surface of the cutting tool toward the inner surface, a slot formed along the threaded hole, and a screw inserted into the threaded hole to push the top surface of the insert pocket toward the top surface of the cutting insert.

9. The cutting tool according to claim 1, wherein an upper portion of the top surface of the insert pocket comprises a threaded hole integrally formed in the cutting tool, a slot formed along the threaded hole, and a screw inserted into the threaded hole to push the top surface of the insert pocket toward the top surface of the cutting insert.

10. The cutting tool according to claim 1, wherein the one or more cutting portions further comprises a cartridge of which lower portion includes the top surface of the insert pocket with one or more projecting portions with a shape of serration and a cartridge pocket formed on a body of the cutting tool for receiving the cartridge; said cartridge comprising a threaded hole formed at the radial outer side surface of the cutting tool toward the inner surface, a slot formed along the threaded hole, and a screw inserted into the threaded hole to push the top surface of the insert pocket toward the top surface of the cutting insert.

11. A rotary cutting tool having a rotary axis (A) and comprising:
   a cutter body having a plurality of circumferentially spaced apart cutting portions along a periphery thereof;
   each cutting portion comprising:
      a cartridge pocket comprising a top surface, a rear supporting surface and a bottom supporting surface;
      a cartridge mounted in the cartridge pocket, the cartridge comprising:
         a top surface which contacts the top surface of the cartridge pocket;
         a radial inner side surface which contacts the rear supporting surface of the cartridge pocket;
         a bottom surface that contacts the bottom supporting surface of the cartridge pocket; and
         a radial outer side surface; and
      an insert pocket having a top surface, a bottom supporting surface, and a rear supporting surface;
   wherein:
   a serrated portion of the bottom surface of the cartridge forms the top surface of the insert pocket;
   the radial outer side surface of the cartridge is provided with a screw hole formed above the top surface of the insert pocket and a slot formed along the screw hole; and
   upon rotation of a securing screw further into the screw hole, the slot is configured to expand and urge the top surface of the insert pocket in the direction of the bottom supporting surface of the insert pocket.

12. The rotary cutting tool according to claim 11, further comprising a cutting insert retained in the insert pocket, the cutting insert comprising:
   a first inner side surface mating with the rear supporting surface of the insert pocket;
   a bottom surface mating with the bottom supporting surface of the insert pocket; and
   a top surface comprising one or more outwardly sloped surfaces mating with the serrated portion of the bottom surface of the cartridge which forms the top surface of the insert pocket.

13. The rotary cutting tool according to claim 12, wherein rotation of the securing screw further into the screw hole applies:
   a first component force perpendicular to the first inner side surface of the cutting insert which forces the cutting insert against the rear supporting surface of the insert pocket; and
   a second component force perpendicular to the bottom surface of the cutting insert which forces the cutting insert against the bottom supporting surface of the insert pocket.

14. The rotary cutting tool according to claim 12, further comprising an adjusting screw configured to adjust an axial position of the cutting insert.

15. The rotary cutting tool according to claim 12, wherein the outwardly sloped surfaces on the top surface of the cutting insert extend axially along the rotary axis (A).

16. The rotary cutting tool according to claim 12, wherein:
   the serrated portion of the bottom surface of the cartridge comprises a plurality of projection portions.

17. The rotary cutting tool according to claim 12, wherein:
   the serrated portion of the bottom surface of the cartridge comprises a plurality of recessed portions.

18. The cutting tool according to claim 1, wherein the cutting insert includes a single cutting tip.

19. The cutting tool according to claim 4, wherein the cutting insert includes a single cutting tip.

* * * * *